United States Patent

[11] 3,599,577

[72] Inventor Gunter Niebisch
Bemerode, Germany
[21] Appl. No. 853,130
[22] Filed Aug. 26, 1969
[45] Patented Aug. 17, 1971
[73] Assignee Otto Hansel GmbH
Hannover, Germany

[54] APPARATUS FOR WITHDRAWAL OF VISCOUS OR PULPY HARD SUGAR MASSES FROM OPEN SPACES UNDER VACUUM, IN PARTICULAR IN COOKING MACHINES
7 Claims, 1 Drawing Fig.

[52] U.S. Cl. ................................................ 107/4,
18/12, 107/14
[51] Int. Cl. ........................................... A21c 11/20,
B29f 3/08
[50] Field of Search .......................................... 107/4 F, 14
C, 14 CA, 14; 99/272, 273; 18/12 ST

[56] References Cited
UNITED STATES PATENTS

| | | | |
|---|---|---|---|
| 2,078,565 | 5/1937 | Durst.......................... | 107/14 C |
| 2,530,503 | 11/1950 | Bonham ....................... | 18/12 ST |
| 2,593,265 | 5/1952 | Chase........................... | 18/12 ST |
| 2,692,405 | 10/1954 | Gayler.......................... | 18/12 ST |
| 2,722,716 | 11/1955 | Henning....................... | 18/12 ST |

*Primary Examiner*—John E. Murtagh
*Attorney*—Ernest G. Montague

ABSTRACT: An apparatus for withdrawal of viscous or pulpy hard sugar masses from spaces under vacuum, in particular in cooking machines, which comprises a feeding chamber, and a vacuum chamber connected with the feeding chamber. At least one threaded conveyor screw is operable in the feeding chamber and steplessly controllable as to its speed. The threads of the conveyor screw extend only along a part of the length of the feeding chamber, and the latter has an outlet and a storage chamber for masses to be conveyed cooperating with the feeding chamber.

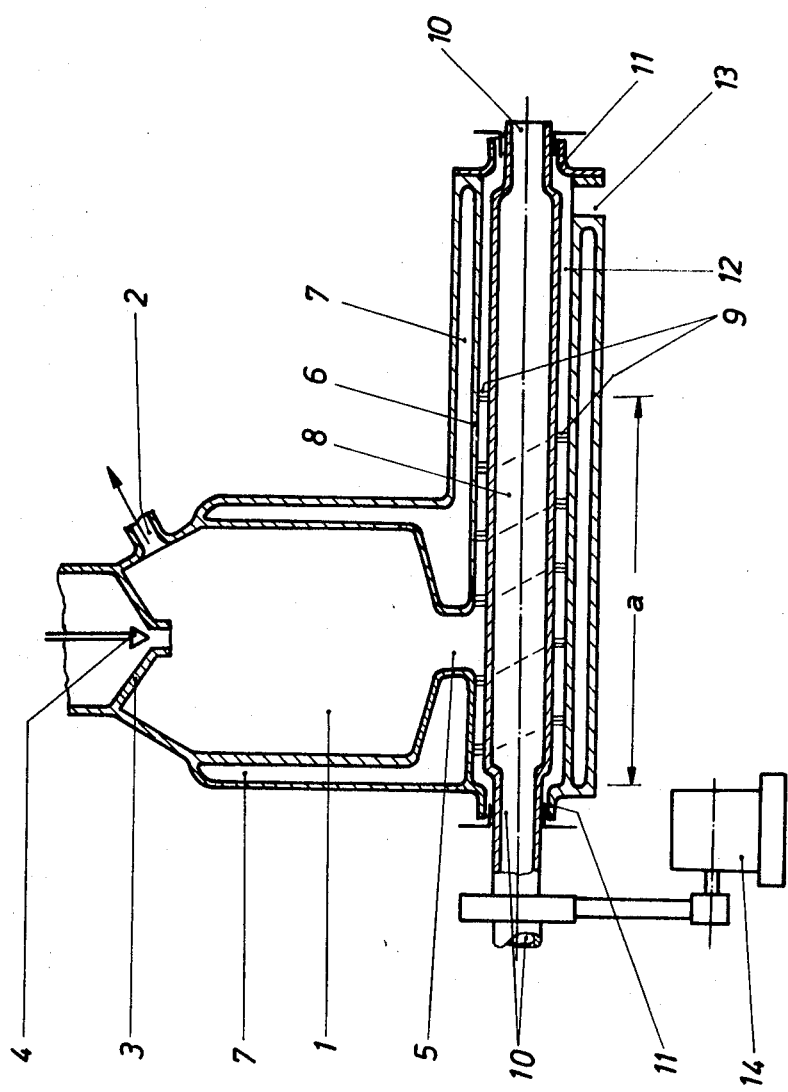

APPARATUS FOR WITHDRAWAL OF VISCOUS OR PULPY HARD SUGAR MASSES FROM OPEN SPACES UNDER VACUUM, IN PARTICULAR IN COOKING MACHINES

The present invention relates to an apparatus for withdrawal of viscous or pulpy hard sugar masses from spaces under vacuum, in particular in cooking machines, stirring devices and others.

The feeding of highly viscous masses from spaces under vacuum is known One uses for this purpose mostly pumps with a high suction output. In amorphous hard-sugar masses, this type of conveyance and performance, respectively, is not applicable, since they recrystallize in case of a strong friction and are more workable.

It is one object of the present invention to provide an apparatus for withdrawal of viscous or pulpy hard sugar masses from spaces under vacuum, in which the recrystallization is completely avoided or, at least, extensively limited.

It is another object of the present invention to provide an apparatus for withdrawal of viscous or pulpy hard sugar masses from spaces under vacuum, wherein a feeding chamber is connected to the output of the vacuum chamber with at least one feeding screw operating stepless as to its speed, the screw threads of which extend not only over a part of the length of the feeding chamber, and free a storage space in front of the chamber exit for the mass to be fed.

The present invention takes advantage of the fact that, in case of a low glucose syrup content of the mass, the recrystallization takes place much faster than with a high content. Accordingly, the feeding device in accordance with the present invention is designed such, that the masses flow through this device slowly only, whereby the tolerances between the feeding member is so great, that any nominal friction in the mass is avoided.

Preferably, the feeding screw has a screw thread only over up to about two-thirds of its total length, while the last part of the feeding screw is formed substantially as a smooth tube.

The walls of the feeding chamber as well as of the screw itself are heatable, in order to avoid a hardening of the mass inside of the device.

It is yet another object of the present invention to provide an apparatus for withdrawal of viscous or pulpy hard sugar masses from spaces under vacuum, in particular in cooking machines, wherein the gap between the core of the screw and the inner wall of the feeding chamber is relatively narrow. In this manner it is brought about that the relatively tough or coarse hard sugar masses have such capacity of persistence, that the mass resists the atmospheric pressure which operates against the feeding. On the other hand, the threads result in a feeding effect, so that the mass can be fed from the space having pressure below atmospheric pressure into the free atmosphere through the exit opening of the feeding chamber.

In accordance with the present invention, the device is simultaneously applicable for the feeding and admixing of colors, acids, aromas and other additions, by connecting in accordance with the present invention to one end of the feeding chamber, in which the threads of the screw operate, a corresponding feeding device for such additional material.

With these and other objects in view which will become apparent in the following detailed description, the present invention will be clearly understood in connection with the accompanying drawing, in which the only FIGURE is a schematic axial section of a device for working of amorphous hard sugar masses, which device is connected to the vacuum space of a cooking machine.

Referring now to the drawing, the cooking machine or the like has a lower part and a vacuum-cooking chamber 1 is connected to the lower part of the cooking machine or the like, from which vacuum chamber 1, the air is sucked out through a conduit 2 and which, on the other hand, is fed by means of a filling funnel 3 with a control valve 4 with hard sugar masses to be worked.

The chamber 1 has at its lower end an exit opening 5 to which an approximately horizontally extending feeding or delivery chamber 6 is connected.

As can be ascertained, the walls of the chamber 1 and of the delivery chamber 6 are designed as double walls, forming heating chamber 7 which are connected in conventional manner to a heating conduit, for instance, a hot water or steam conduit.

Inside of the approximately horizontally extending feeding chamber 6 is operatively arranged a feeding screw, which comprises substantially a hollow cylinder core 8 with screw threads 9 disposed thereon. The hollow cylinder 8 projects at its ends as a tubular conduit 10 through the bearing positions 11 in the chamber 6 and likewise connected to a heating conduit, so that the heating medium is fed through the inside of the feeding screw. In this manner, the screw and the feeding chamber are all around heatable in order to prevent a cooling and premature recrystallization of the hard sugar masses to be separated.

As is apparent, the gap between the core 8 of the feeding screw and the inner wall of the chamber 6 is relatively narrow. The screw threads extend over about a range which amounts to about two-thirds of the total length of the feeding chamber. Over the remaining length, the screw has no threads. It is smooth at its outer face, so that in this last-mentioned part of the feeding chamber, a storage space 12 is formed which leads to the exit 13. By means of a schematically shown endless drive 14, the peripheral speed of the feeding screw is controllable.

The sugar flowing through the outlet 3 and the valve 4, respectively, from the cooking machine of known structure set before the chamber 1, enters the latter, which chamber 1 is in connection, by means of a suction conduit 2, with a means for producing a pressure below atmospheric pressure. The sugar mass reaches, by means of a passage 5 between the chamber 1 and the feeding chamber 6, the feeding screw 8, 9 inside the feeding chamber 6. The screw threads a push the mass towards the storage space 12, and in particular against the effect of the below atmospheric pressure prevailing in the chamber 1. At the exit 13, the material can emerge into the atmosphere. The working speed of the screw is to be set by means of the drive 14, such that only a low-feeding speed is obtained towards the exit. It is to be understood that the exit 13 can be closed, in order not to suck the air backwardly through the feeding chamber into the chamber 1 which is below atmospheric pressure. The closing of the exit 13 is to be maintained until the feeding screw is filled with a sufficient quantity of sugar masses.

The described exit apparatus can be used still for addition of acids, aroma, colors, etc. In this case, at the entrance side of the feeding chamber 6, a corresponding feeding device for such additional material must be connected.

While I have disclosed one embodiment of the present invention, it is to be understood that this embodiment is given by example only and not in a limiting sense.

I claim:

1. A cooking machine for hard sugar masses, comprising
a heated cooking chamber,
a vacuum generator means operatively connected with said cooking chamber,
said cooking chamber having a cooking chamber exit for the cooked mass at its bottom,
a feeding chamber connected to said cooking chamber exit,
at least one threaded conveyor screw disposed in and operable in said feeding chamber and steplessly controllable as to its speed,
the threads of said conveyor screw extending only along a part of the length of said feeding chamber, and
said feeding chamber having an outlet and a storage chamber before said outlet for masses to be conveyed cooperating with said feeding chamber.

2. The apparatus, as set forth in claim 1, wherein said storage chamber is a separate chamber following said feeding chamber.

3. The apparatus, as set forth in claim 1, which includes means for heating said conveyor screw and walls of said feeding chamber.

4. The apparatus, as set forth in claim 3, wherein said means for heating said conveyor screw includes said conveyor screw.

5. The apparatus, as set forth in claim 1, wherein said feeding chamber comprises a cylinder, and said conveyor screw comprises a hollow cylinder of a diameter to produce a narrow annular passage between the inner wall of said feeding chamber and said conveyor screw.

6. The apparatus, as set forth in claim 1, wherein said feeding chamber is double-walled and defines a heating chamber connected with a heating conduit.

7. The apparatus, as set forth in claim 1, wherein said feeding chamber includes a plurality of feeding inlets adapted for feeding of colors, acids, and aroma materials.